United States Patent [19]

Satzler

[11] 4,382,834

[45] May 10, 1983

[54] ROTATING CUTTER AND STITCHER FOR SEVERING MATERIAL FROM A BODY

[75] Inventor: Ronald L. Satzler, Princeville, Ill.

[73] Assignee: Caterpillar Tractor Co., Peoria, Ill.

[21] Appl. No.: 343,470

[22] Filed: Jan. 28, 1982

Related U.S. Application Data

[63] Continuation of Ser. No. 245,227, Jun. 16, 1980, abandoned.

[51] Int. Cl.³ .................... B29C 17/04; B29H 15/00
[52] U.S. Cl. ................................ 156/382; 83/471.2; 83/483; 83/507; 156/394 R; 156/445; 156/475; 156/523; 264/163; 264/292; 264/248; 264/317
[58] Field of Search ............... 156/118, 155, 215, 267, 156/285, 286, 382, 394 R, 443, 445, 475, 523, 530; 264/81, 90, 92, 94, 96, 153, 161, 163, 320, 322, 248, 292, 317; 83/469, 471, 471.2, 475, 476, 483, 490, 499, 507

[56] References Cited

U.S. PATENT DOCUMENTS

| 3,586,566 | 6/1971 | Van Uleit et al. | 156/214 |
| 3,606,921 | 9/1971 | Grawey | 152/355 |
| 4,044,085 | 8/1977 | Grawey | 264/90 |
| 4,050,336 | 9/1977 | Stubbings | 83/486.1 |

Primary Examiner—Caleb Weston
Attorney, Agent, or Firm—Wegner, Stellman, McCord, Wiles & Wood

[57] ABSTRACT

In a machine for covering a toroidal body with layers of elastomeric material wherein a cutting and stitching apparatus is provided for severing a scrap portion of a sheet of material (32) from a portion of the sheet that has been applied to a toroidal core (30) and stitching the applied portion to the core (30). The apparatus (16,18,20,22) includes actuators (45,54) for positioning the cutters (104) and the stitchers (105) in operative position on the outside periphery and the inside periphery of the core (30) with the rotatable cutters (104) in proper position for effecting a cut through the material without scoring the core (30) or other underlying material. The cutting and stitching apparatus (16,18,20,22) is rotated about the core (30) as the rotating cutter (104) severs the material. The cutter (104) is programmed to retract as the stitchers (105) continue to stitch the edge of the applied material to the core (30).

12 Claims, 14 Drawing Figures

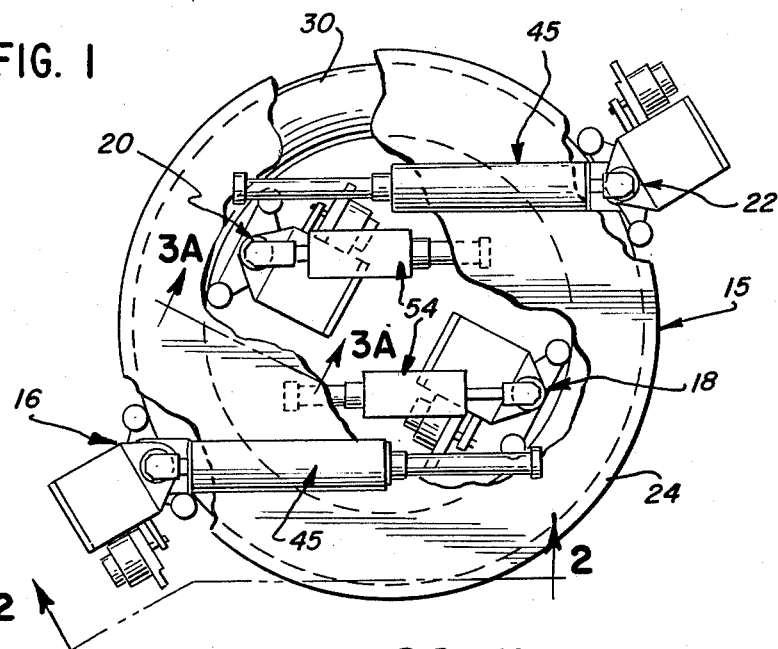
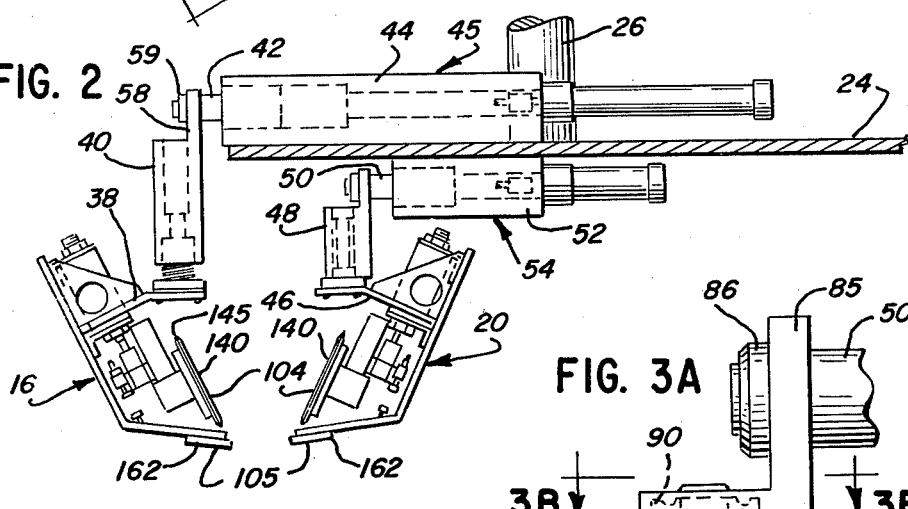
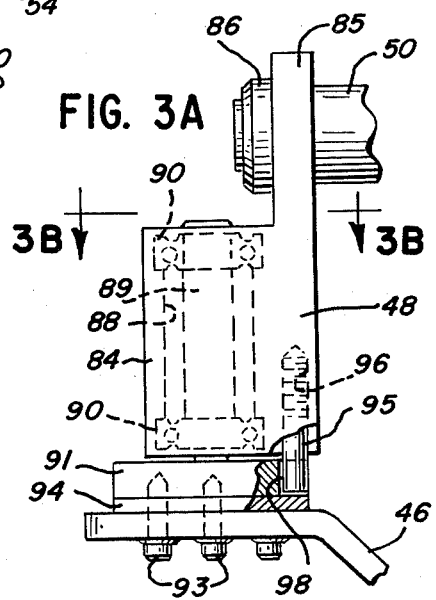
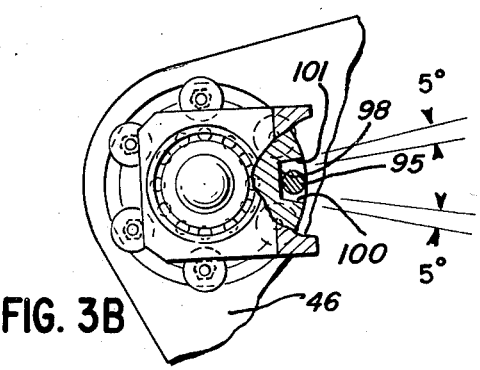

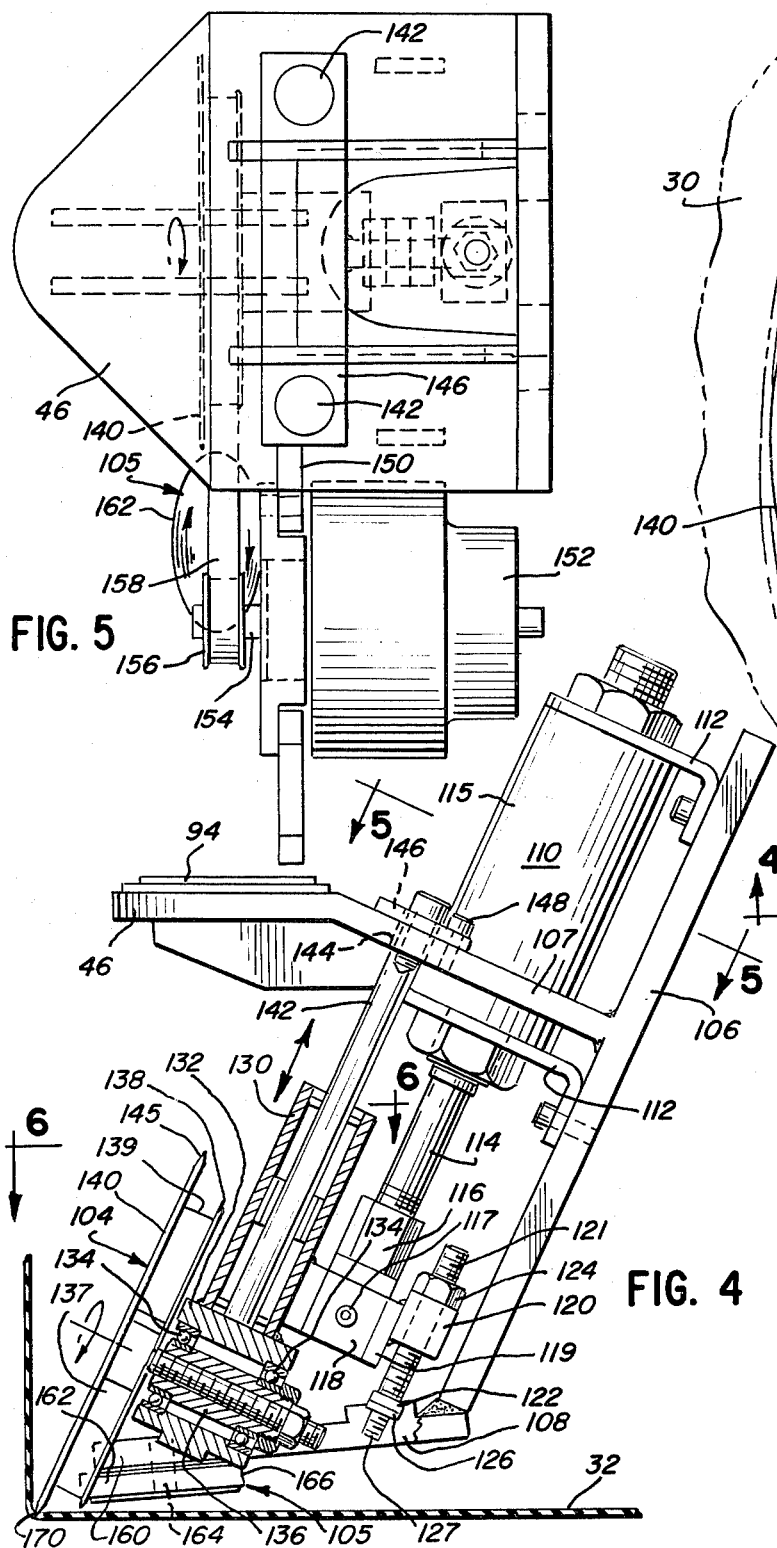
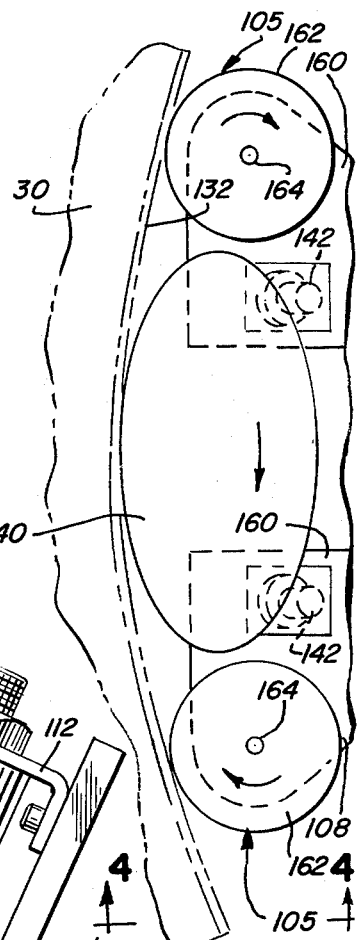
FIG. 5
FIG. 6
FIG. 4

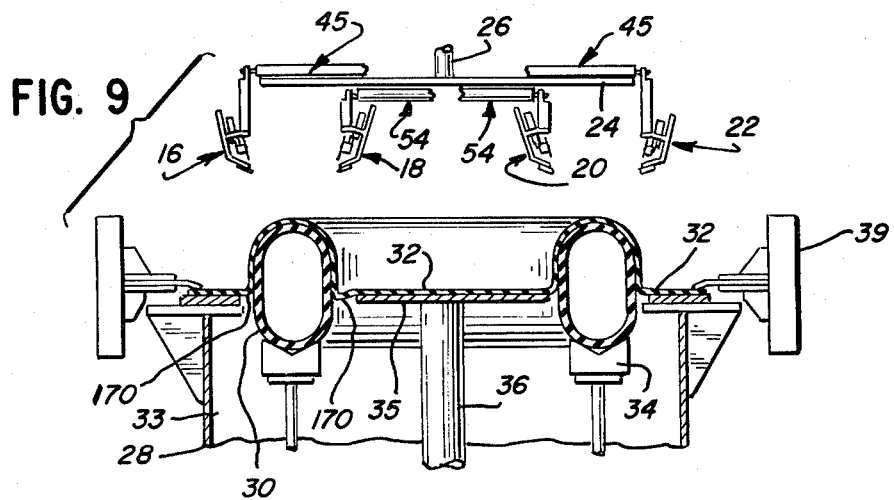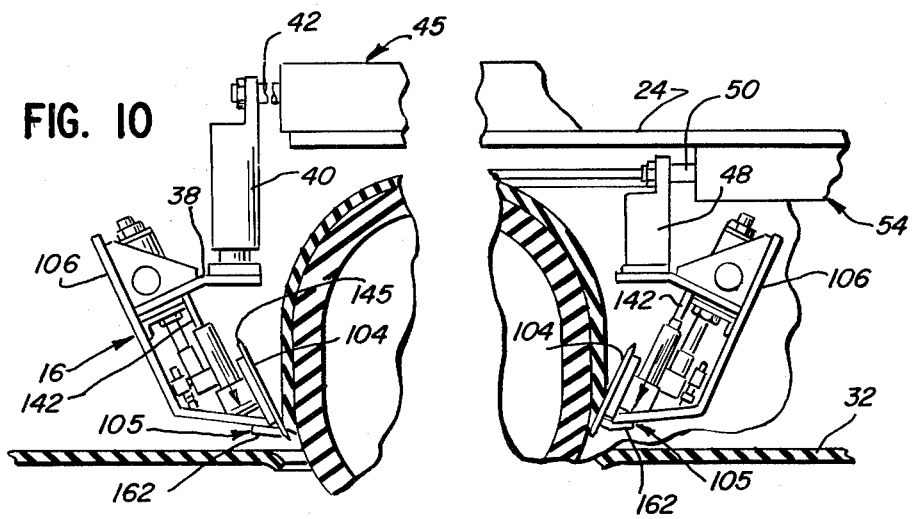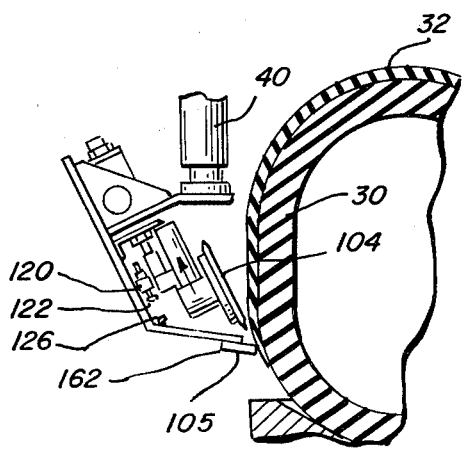

ROTATING CUTTER AND STITCHER FOR SEVERING MATERIAL FROM A BODY

This is a continuation of application Ser. No. 245,227 filed June 16, 1980, abandoned.

DESCRIPTION

1. Technical Field

This invention relates to an apparatus for applying and trimming a layer of material on a toroidal core and, more particularly, to a rotating cutter and stitcher therefor.

2. Background Art

In manufacturing toroidal bodies, such as a tube tire shown in the Grawey U.S. Pat. No. 3,606,921, issued Sept. 21, 1971 and assigned to the common assignee of the present application, a layer of material is laid on a portion of a sand core whereupon the edges of the layer are trimmed after which the dges of the layer are tacked to the core. Subsequent layers of material are laid on another portion of the core or on the previously laid layer to build up a tube of material for subsequent processing. One prior art apparatus for applying the material is shown in the Grawey U.S. Pat. No. 4,044,085, issued Aug. 23, 1977, entitled "Method for Forming a Tube Article on a Core" and is assigned to the common assignee of the present application. The Grawey U.S. Pat. No. 4,044,085 shows apparatus for vacuum forming a sheet of material on slightly more than one-half of the sand core, whereupon a pair of concentric knives are engaged with the sheet to sever the applied portion of the sheet from the scrap portion of the sheet. The cutting is performed by the knife edges being urged axially into contact with the sheet of material which is backed by a backing member to sever the material. Stitchers are then brought into contact with the severed edge of the material to stitch the severed edge to the core or to an underlying layer of material. Although the severing and stitching performed by the apparatus of the U.S. Pat. No. 4,044,085 has been successful, it has been found that the blades require frequent sharpening. The apparatus also requires extra movements to sever and then to stitch the material, thereby resulting in slower production time.

In another type of apparatus, such as shown in the Van Vleet et al U.S. Pat. No. 3,586,566, issued June 22, 1971, entitled "Process of Encapsulating an O-Ring", a toroidial core is formed on the end of a cylindrical wall and is partially encircled with the sheet of material whereupon cutters sever the material by shearing across an opening from which the material extends. The cutters of the U.S. Pat. No. 3,586,566 are actually intended to score into the junction between the cylindrical wall and the core about which the rubber material is being formed. The scoring of the core would be unacceptable to a tube for a tire or the like.

In building the elastomeric tube, or the like, it is important not only that the core not be damaged as by scoring, but also that underlying layers of material not be severed or scored as the various layers are applied to the core. Scoring the core or the underlying layers of material may cause an unevenness that will carry over into the surface of the finished tire which may create problems.

The present invention is directed to overcoming one or more of the problems as set forth above.

DISCLOSURE OF INVENTION

In accordance with one aspect of the present invention, a cutting and stitching apparatus is provided for cutting and stitching an applied portion of a sheet of elastomeric material to a core. The apparatus includes a rotatable carrier plate supporting a cutter and a stitcher. The cutter has a rotatably driven blade and the stitcher has a freely rotatable roller. The apparatus includes means for moving the cutter and roller and means for moving the rotatably driven blade of the cutter. A means for rotating the blade of the cutter is also provided.

In the construction of an elastomeric tube by the method of building up multiple layers of sheet material on a core, it has heretofore been the practice to trim excess sheet material by axially urging an annular blade or cutter into contact with the sheet material and pressing the blade through the sheet material. It has been found that the non-rotating blades on this type of apparatus not only require frequent sharpening but also must be moved away from the severed edge prior to stitching the edge to underlying layers.

The present invention overcomes the problems of the prior art by providing a combined cutting and stitching apparatus which is programmed to move into position on diametrically opposite locations on the outside diameter of the core and on diametrically opposite locations on the inside diameter of the core to sever a vacuum formed sheet of material along a tangent to the cross section of the core. The severing cutters are rotatably driven with the stitching rollers acting as gauge wheels as the apparatus is rotated about the core. The cutters are retracted and pressure between the stitchers and the edge of the material is continued so that the stitchers will further stitch the severed edges of the material to the core or to an underlying layer of material. The tangential direction of cut of the rotating cutters avoids scoring or cutting the core or an underlying layer of material.

BRIEF DESCRIPTION OF DRAWINGS

FIG. 1 is a plan view of an embodiment of the present invention with parts broken away;

FIG. 2 is an enlarged, partial elevational view taken along the line 2—2 of FIG. 1, showing one outside cutting and stitching apparatus and one inside cutting and stitching apparatus with the remaining two cutting and stitching apparatuses of FIG. 1 removed;

FIG. 3A is an enlarged view of a mounting element for one inside cutting and stitching apparatus of FIG. 2;

FIG. 3B is a cross-sectional view taken along the line 3—3 of FIG. 3A;

FIG. 4 is an enlarged, elevational view of a preferred form of cutting and stitching apparatus;

FIG. 5 is a view taken along the line 5—5 of FIG. 4;

FIG. 6 is a view taken along the line 6—6 of FIG. 4;

FIG. 9 is a view similar to FIG. 8 only with the core raised and the sheet of material vacuum formed over a portion thereof;

FIG. 10 is an enlarged broken away view showing one exterior cutting and stitching apparatus in position with the cutter severing the applied material from the sheet;

FIG. 11 is an enlarged broken away view showing one interior cutting and stitching apparatus in position with the cutter severing the applied material from the sheet; and FIG. 12 is an enlarged broken away view similar to FIG. 10 only with the cutter retracted and the stitchers stitching the applied material to the core.

BEST MODE FOR CARRYING OUT THE INVENTION

Figure 8:
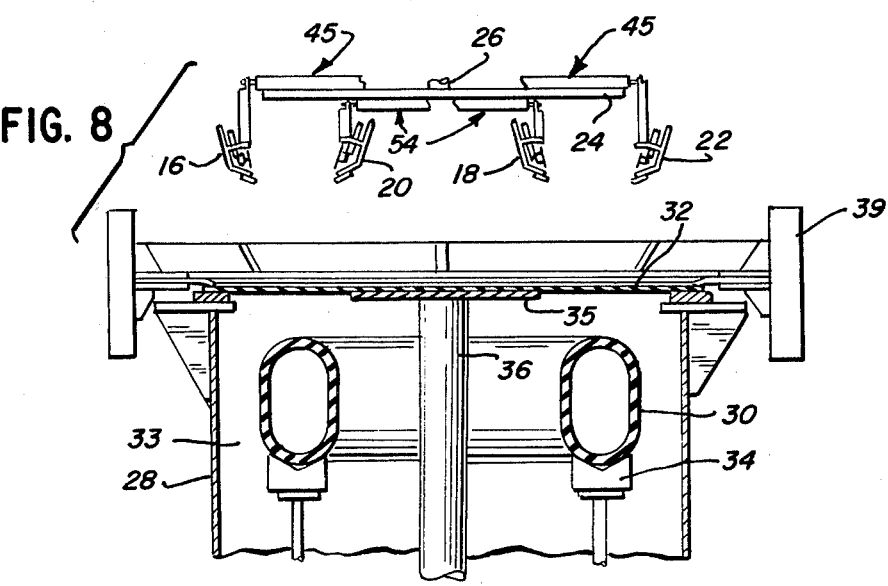
FIG. 8 is a somewhat schematic elevational view of a core in a vacuum chamber prior to vacuum forming the material on the surface of the core and with the cutting and stitching apparatus in the raised and inactive position.

Referring to FIGS. 1 and 2, there is shown a trimming and stitching machine 15 which comprises four cutting and stitching apparatuses 16,18,20 and 22, all carried by an annular carrier plate 24. A shaft 26 is centrally mounted on the annular carrier plate 24 and is rotatably driven (not shown) for rotating the carrier plate 24 in the plane of the plate. Said shaft 26 is also vertically movable so as to raise and lower said plate 24 (see FIG. 8) relative to a vacuum container 28 in which is positioned a vertically movable toroidal sand core 30. The details for spreading a sheet of elastomeric material 32 (as shown in FIGS. 8 and 9) over the open top of the vacuum container 28, raising the vacuum container 28 to seal the sheet of material 32 and container 28 against a fixed ring seal 39, together with the details of the structure for drawing a vacuum in the chamber 33 of the container 28 and for raising a platform 34 and core 30 so as to vacuum form the sheet of elastomeric material 32 over a portion of the surface of the core 30, are conventional. A typical operative structure for accomplishing the vacuum forming is shown and described in the above referred to U.S. Pat. No. 4,044,085.

Referring again to FIGS. 1 and 2, the outside cutting and stitching apparatuses 16 and 22 are carried by the carrier plate 24 for cutting and stitching the elastomeric sheet material 32 on the outside diameter of the core 30. The horizontal axial centerlines for the apparatuses 16 and 22 lie on the same common diameter. Likewise, inside cutting and stitching apparatuses 18 and 20 are carried by the carrier plate 24 for cutting and stitching the material 32 on the inside diameter of the core 30, the centerlines for the apparatuses 18 and 20 lie along the same common diameter. Outside cutting and stitching apparatuses 16 and 22 are each carried by a bracket 38 attached to a mounting element 40 affixed to the outer end of a rod 42 which is axially movable from a cylinder 44 of a fluid motor 45 mounted on the upper surface of the carrier plate 24. Inside cutting and stitching apparatuses 18 and 20 are each carried by a bracket 46 attached to a mounting element 48 affixed to the outer end of a rod 50 which is axially movable from a cylinder 52 of a fluid motor 54 mounted on the lower surface of the carrier plate 24. The fluid motors 45 and 54 are attached to the carrier plate 24 and are connected by fluid conducting lines to a source of pressure with valves and controls, not shown, located in the lines and actuated in response to a signal from a programmed computer such that the valves admit or exhaust fluid from the cylinders 44,52 to move the rods 42,50 and the cutting and stitching apparatuses 16,22, 18,20 toward or away from the sheet of material 32 draped over the core 30.

Figure 7A:
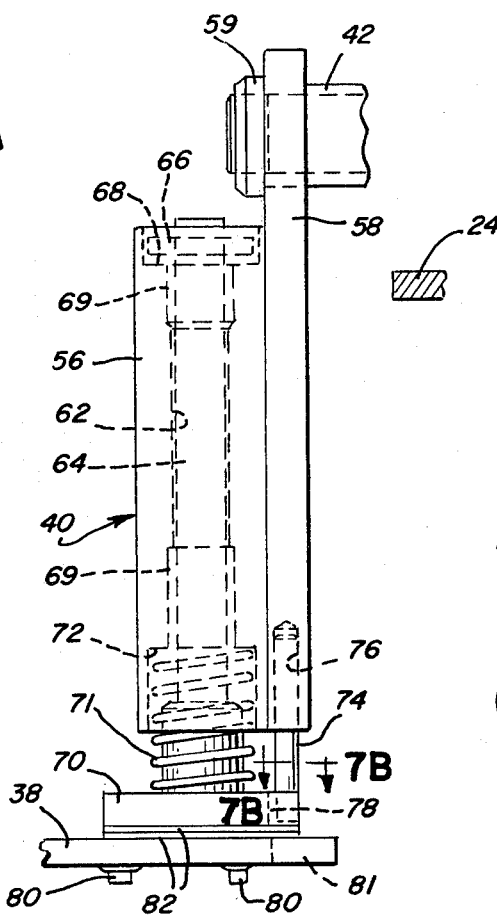
FIG. 7A is an enlarged view of a mounting element for one outside cutting and stitching apparatus of FIG. 2.
Figure 7B:
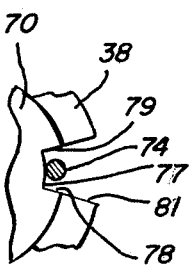
FIG. 7B is a fragmentary broken away view taken along the line 7B—7B of FIG. 7A.

More specifically, the mounting element 40 for the outside apparatuses 16,22, as shown in FIGS. 2 and 7A, is comprised of a housing 56 which has an axially extended wall 58 fixed on the end of the rod 42 by a nut 59, or the like. The housing 56, which is somewhat rectangular in cross section, extends beyond the edge of the carrier plate 24 and has an axially extending opening 62 through which a pivot pin 64 extends. A collar 66 is secured on the end portion of the pivot pin 64, which collar 66 seats in a recess 68 in the end of the housing 56. The pin 64 is radially supported by bearings 69 and has the lower end portion projecting beyond the housing 56 and being attached to a plate 70. A compression spring 71 encircles the pin 64 and bears, at one end, against the plate 70 and, at the other end, against a shoulder 72 in the housing 56. A limit pin 74 (FIG. 7B) is anchored in an opening 76 lying parallel to the pin 64, with the pin 74 projecting downward from the housing 56 and into a cutout 77 in plate 70. The cutout 77 has spaced end walls 78,79. The bracket 38 has a cutout 81 which is aligned with cutout 77 so that when the spring 71 is compressed, the pin 74 projects into the cutouts 81 and 77 to limit the amount of rotation of the outside apparatuses 16,22 relative to the mounting element 40. The plate 70 is bolted by bolts 80 to the bracket 38 with an appropriate number of shims or spacers 82 positioned between the bracket 38 and the plate 70. The shims 82 are used to locate the cutting and stitching apparatus at the desired height relative to the desired cutting plane of the sheet 32 on the core 30 as will be described more in detail hereinafter.

The mounting element 48 for the inside apparatuses 18,20, and as shown in FIGS. 2, 3A and 3B, is comprised of a housing 84 which has an axially extended wall 85 fixed on the end of the rod 50 of the fluid motor 54 by a nut 86, or the like. The housing 84 is somewhat rectangular in cross section (see FIG. 3B) and has an axially extending opening 88 through which a pivot 89 extends. Ball bearing assemblies 90 rotatably position the pivot 89 in the housing 84 with one end portion projecting beyond the housing 84 and being secured to a plate 91. The plate 91 is bolted by bolts 93 to the bracket 46 with shims or spacers 94 therebetween. The shims or spacers 94 are used to properly position the height of the cutting and stitching apparatuses 18 and 20, the reason for which will be described hereinafter. A limit pin 95 is anchored in an opening 96 in the housing 84 and projects downwardly from the housing 84 and into a cutout 98 in the plate 91. The cutout 98 has spaced apart end walls 100,101 which permits the pin 95 and housing 84 to rotate about the pivot 89 a limited amount. As shown, the bracket 46 can rotate 10° relative to the housing 84.

Mounted on each of the two brackets 38 and on each of the two brackets 46, is a cutter 104 and a stitcher 105 with each cutter 104 and each stitcher 105 being substantially the same and operating in the same fashion. Only one cutter 104 and one stitcher 105, as shown in FIGS. 4, 5 and 6, will be described in detail. FIG. 4 illustrates one inside cutting and stitching apparatus 18 mounted on the bracket 46 carried by the housing 84 of the mounting element 48 on the rod 50 of the fluid motor 54. A back plate 106 is welded at a right angle to a downwardly angled portion 107 of the bracket 46. A foot plate 108 is welded to the back plate 106 and projects in the same direction as the bracket 46 in spaced relation to said bracket 46. A fluid motor 110 is mounted to said back plate 106 by a pair of spaced apart straps 112 and has a rod 114 movable into and out of a cylinder 115 of said motor. A clevis 116 is threaded on the rod 114 and is pinned by pin 117 to a cross member 118, one end 119 of which is secured, as by welding or the like, to a threaded sleeve 120. An adjusting bolt 121 is threaded through sleeve 120 and has a pad 122 on the distal end thereof. A nut 124 on the bolt 121 bears against the sleeve 120 to lock the bolt 121 in position with respect to the sleeve 120. A stop 126 is mounted on a member 127 threaded into the foot plate 108 and is aligned with the pad 122.

The cross member 118 has a housing 130 welded, or the like, thereto at the midportion thereof. The housing 130 has a bearing mount 132 welded to the lower midportion thereof with a pair of spaced bearings 134 rotatably supporting an axle 136 extending at right angles to the housing 130. A pulley 137 is fixed to the axle 136 and has a flange 138 on one edge of the surface 139 thereof with a circular cutting blade 140 affixed to the pulley 137 and extending radially outward beyond the surface of the pulley 137 in spaced relation to said flange 138. A pair of spaced apart slide bars 142 are secured to the bearing mount 132 and extend through seals in the housing 130 and through bushings 144 in a plate 146 secured as by bolts 148 to the bracket 46. The fluid motor 110 is connected to a source of fluid through valves (not shown) which are controlled by signals from a pre-programmed computer (not shown) which will retract the rod 114 into the cylinder 115, moving the housing 130 with the cutting blade 140 toward the bracket 46. The slide bars 142 slide in the bushings 144 to guide the movement of the cutter 140 toward and away from a cutting position. The pad 122 on the adjusting bolt 121 contacts the pad on the stop 126 to position the cutting edge 145 of the blade 140 in the proper cutting position.

A mounting member 150 is secured to one side of the housing 130 and supports a drive motor 152, a shaft 154 and a drive pulley 156. A belt 158 connects the drive pulley 156 to the pulley 137 so that actuation of the motor 152 will rotate the cutting blade 140.

The stitchers 105 are mounted on the spaced, bifurcated end portions 160 (FIG. 6) of the foot plate 108. Each stitcher 105 is comprised of a roller 162 freely rotatable about a pivot 164 affixed to said portions 160. The contact face 166 of the roller 162 is angled slightly with respect to the sides of the pulley so that the contact face 166 will lie in the plane of the sheet of material 32 and parallel to the side wall of the core 30 when it is moved into contact therewith for stitching.

The rollers 162 serve both as stitchers and as horizontal gauge wheels for the cutter blade 140 and, as shown in FIG. 6, are in contact with the wall of core 30 when the cutter blade 140 is cutting the sheet of material 32. As shown in FIG. 4, the roller 162 illustrated is the remote roller 162 of FIG. 6 and, although it appears to be spaced rearward of the core 30, it is, in fact, in contact with the core 30 and is gauging the cut of the cutter 140.

Industrial Applicability

As shown somewhat schematically in FIGS. 8 and 9, the vacuum container 28 has a core 30 therein on a platform 34. A sheet of elastomeric material 32 is laid across the opening in the container 28 and is supported in the midportion on a fixed circular table 35 carried by a pillar 36. The material 32, container 28 and table 35 are raised to engage the material against the seal ring 39 to effect a seal between the material 32 and the container 28. At a predetermined signal from the computer controls, the platform 34 will raise the core 30 from the position of FIG. 8 to the position of FIG. 9 as a vacuum is drawn in the chamber 33. The vacuum will draw the material 32 around the one side of the core 30 to a desired position, such as just beyond the mid-circumferential plane of the core. A small indented bead 170 is formed at the junction of the material 32 and the core 30.

The computer controls will activate the power to lower the shaft 26, carrier plate 24 and cutting and stitching apparatuses 16,18,20,22 to a position with the foot plate 108 just above the desired cutting plane for the material 32. The computer controls will now actuate the fluid motors 45,54 to move the cutters 104 and stitchers 105 into a position with the rollers 162 contacting the material ahead and behind the cutter blades 140. The computer control will then activate the fluid motors 110 to move the cutting blade 140 toward the bead 170 in the material 32 and to energize the motor 152 to start rotating the cutting blade 140 about its axis. The advance of the cutting blade 140 is arrested when the pad 122 contacts the stop 126 at which point the plane of the cutting blade 140 is parallel to the core 30 so that the edge 145 of the rotating blade 140 will slice through the material 32 as the shaft 26 rotates the plate 24 and cutting and stitching apparatuses 16,18,20,22 traverse the core 30 (FIGS. 10 and 11) until the material applied to the core 30 is separated from the material around the outer edge and around the center portion of the sheet. The angle of the plane of the blade to the core is such that the cutting blade 140 will not contact or cut either the core 30 or a layer of material previously stitched to the core. Using the four apparatuses shown will require only a 180° rotation of the plate with the cutting blades 140 in cutting position. However, in practice, the plate has been rotated a full 360° to produce a clean cut and to permit the rollers 162 to initially stitch the newly cut edge of the sheet of material 32 to the core 30. As soon as the applied portion of the material is severed from the sheet, the cutters 104 are retracted and the rotation of the blades 140 is stopped. The plate 24 continues to rotate another 360° with only the rollers 162 (stitchers 105) in contact with the newly cut or severed edge of the material to further stitch the edges of the core 30 or to the previously laid up layer of material. The fluid motors 45,54 are programmed to apply the rollers 162 of the stitchers 105 against the severed edge of the material with a predetermined amount of force. During the cutting and stitching of the material, the outside apparatuses 16,22, being diametrically opposite each other, apply force toward each other on the outside of the core 30 at the same time the inside apparatuses 18,20 apply force diametrically opposite each other outwardly. After the rollers 162 of the stitchers 105 have circled the core 30 in contact with the cut edge of material the requisite number of times, the controls move the outside apparatuses 16,22 outwardly and the inside apparatuses 18,20 inwardly, out of contact with the now stitched edges of the material on the core 30 and at a predetermined point the shaft 26 raises the plate 24 and apparatuses 16,18,20,22 to the at rest raised position, such as shown in FIG. 8.

In the event only one outside and one inside cutting and stitching apparatus is used, the apparatuses will have to be rotated at least a full 360° to sever the applied material from the sheet of material, and the stitching step would require additional rotations of the plate.

The stitching rollers 162 of stitchers 105 are used as gauging rollers by being adjusted to contact the material on either side of the cutting blade 140 as the cutter is cutting the material.

To adjust the plane of cut and stitch, shims 82 and 94 can be added or subtracted from between the housings 56 and 84, respectively, to lower or raise the plane of the cut and stitch. The pins 74 and 95 in the cutouts 77 and 98 permit the cutting and stitching apparatuses 16,18,20,22 to adjust a few degrees either side of center of self-adjust to the correct alignment with the core 30 as it is brought into contact therewith. The outside apparatuses 16,22 are vertically spring cushioned relative to the housings 56 to allow for certain misalignments. Normally the spring 71 is in a neutral condition holding the attached apparatuses 16,22 at the desired height.

Other aspects, objects and advantages of this invention can be obtained from a study of the drawings, the disclosure and the appended claims.

I claim:

1. A cutting and stitching apparatus (16,18,20,22) for cutting and stitching an applied portion of a sheet of elastomeric material (32) to a core (30), said cutting and stitching apparatus comprising:
   a rotatable carrier plate (24);
   a cutter (104) supported by said carrier plate (24) and having a rotatably driven blade (140);
   a stitcher (105) supported by said carrier plate (24) and having a freely rotatable roller (162);
   actuator means (45,54) for moving said cutter (104) and said stitcher (105) toward and away from said core (30);
   means (110) for moving said rotatably driven blade (140) of said cutter (104); and,
   means (152) for rotating said blade (140).

2. An apparatus as set forth in claim 1, including means (26) for raising and lowering said carrier plate (24).

3. An apparatus as set forth in claim 2, wherein at least two cutters (104) and at least two stitchers (105) are supported by said plate (24), one of said cutters (104) and one of said stitchers (105) being carried by said actuator means (45) on said plate (24), the other one of said cutters (104) and the other one of said stitchers (105) being carried by said actuator means (54) on said plate (24), each of said actuator means (45,54) simultaneously moving said respective cutter (104) and stitcher (105) into a predetermined relationship with opposite sides of said core (30).

4. An apparatus as set forth in claim 2, wherein at least four cutters, (104) and at least four stitchers (105) are carried by said plate (24), two of said cutters (104) and two of said stitchers (105) being movable into and out of operative relationship with an outside periphery of said core (30) along a common diameter thereof, and the remaining two of said cutters (104) and stitchers (105) being movable into and out of operative relationship with an inside surface of said core (30) along a common diameter thereof.

5. An apparatus as set forth in claim 1, wherein said actuator means (45,54) is a fluid motor having a cylinder (44,52) with an axially extendible rod (42,50).

6. An apparatus as set forth in claim 5, including a mounting element (40,48) and a bracket (38,46) suspended from said rod (42,50), and wherein said means (110) for moving said blade (140) is carried by said bracket (38,46), said means (110) including a fluid motor having a cylinder (115) with an axially extendible rod (114), a slide (142) mounted parallel to said rod (114), and a bearing mount (132) connected to said rod (114) and said slide (142).

7. An apparatus as set forth in claim 6, wherein said roller (162) of said stitcher (105) is mounted on said bracket (38,46), and said fluid motor (45,54) moves said roller (162) into stitching contact with a severed edge of the sheet of material (32).

8. An apparatus as set forth in claim 6, including shims (82,94) disposed between the bracket (38,46) and said mounting element (40,48) and being of a construction sufficient for locating a cutting edge (145) of the blade (140) in a desired cutting plane.

9. An apparatus as set forth in claim 6, including a pin (74,95) projecting downwardly from said mounting element (40,48) into a slot (77,98) in said bracket (38,46).

10. In a vacuum-forming mechanism for applying a layer of elastomeric sheet material (32) to one side of a core (30), said mechanism comprising a vacuum container (28) having said core (30) positioned therein, said container (28) and said core (30) being axially movable relative to each other to move said core (30) from a position within said container (28) to a position partially raised above the open end of said container (28), means (39) for fastening said sheet of elastomeric material (32) over the open end of said container (28) when said core (30) is in position within said container (28), means for drawing a vacuum in said container (28) as said core (30) is moved to said position partially raised above the open end of said container (28) whereby a portion of said sheet of material (32) will be applied to one side of said core (30), in combination:
   a cutting and stitching means (16,18,20,22) for cutting and stitching said applied portion of said sheet of material to said core (30), said cutting and stitching means (16,18,20,22) comprising:
   a rotatable carrier plate (24);
   a cutter (104), having a rotatably driven blade (140);
   a stitcher (105);
   actuator means (45,54) for moving said stitcher (105) and said cutter (104) between a first position spaced from said core (30) and a second position in close proximity to a junction between the applied portion of said sheet of material (32) and the remainder of said sheet;
   means (110) for advancing and retracting the rotatably driven blade (140) of said cutter (104) toward said junction between the applied portion of the sheet of material (32) and the remainder of said sheet, the plane of said blade (140) lying in a direction parallel with said core (30), and said rotatably driven blade (140) slicing through said junction of the sheet of material (32) in response to said cutter (104) being advanced and said carrier plate (24) being rotated about the axis of said core (30);
   said actuator means (45,54) moving said stitcher (105) into stitching contact with said severed edge of said applied portion of the sheet of material (32) in response to said cutter (104) being retracted and said carrier plate (24) being rotated to rotate said stitcher (105) about said core (30); and,
   means (26) for raising and lowering said carrier plate (24) and said cutting and stitching means (16,18,20,22) relative to said core (30) and relative to said vacuum container (28).

11. A vacuum-forming mechanism as set forth in claim 10, wherein at least two cutters (104) and at least two stitchers (105) are carried by said carrier plate (24) with one actuator means (45) for one of said cutters (104) and one of said stitchers (105) and a separate actuator means (54) for the other one of said cutters (104) and the other one of said stitchers (105), said one actuator means (45) moving said respectively supported cutter (104) and stitcher (105) toward and away from an outside diameter of the core (30), said other actuator means (54) moving said respectively supported cutter (104) and stitcher (105) toward and away from an inside diameter of said core (30).

12. A vacuum-forming mechanism as set forth in claim 10, wherein said actuator means (45,45,54,54) includes four fluid motors each of said fluid motors (45,45,54,54) supporting one of said cutters (104) and one of said stitchers (105), the first two of said fluid motors (45,45) supporting said cutters (104) and said stitchers (105) for movement toward and away from an outside diameter of said core (30) along a common diameter of said core (30), the other two of said fluid motors (54,54) supporting said cutters (104) and said stitchers (105) for movement toward and away from an inside diameter of said core (30) along a common diameter of said core (30).

* * * * *